(12) United States Patent
Al Chalabi et al.

(10) Patent No.: US 12,391,555 B2
(45) Date of Patent: Aug. 19, 2025

(54) PROCESS FOR PRODUCING ACTIVATED CARBON AND HYDROGEN

(71) Applicants: Chinook Sciences Limited, Nottingham (GB); Rifat Al Chalabi, Nottingham (GB)

(72) Inventors: Rifat Al Chalabi, Nottingham (GB); Ophneil Henry Perry, Nottingham (GB); Fanli Meng, Nottingham (GB)

( * ) Notice: Subject to any disclaimer, the term of this patent is extended or adjusted under 35 U.S.C. 154(b) by 912 days.

(21) Appl. No.: 17/423,832

(22) PCT Filed: Jan. 17, 2020

(86) PCT No.: PCT/GB2020/050100
§ 371 (c)(1),
(2) Date: Jul. 16, 2021

(87) PCT Pub. No.: WO2020/148551
PCT Pub. Date: Jul. 23, 2020

(65) Prior Publication Data
US 2022/0162075 A1 May 26, 2022

(30) Foreign Application Priority Data
Jan. 17, 2019 (GB) ..................................... 1900676

(51) Int. Cl.
*C01B 32/324* (2017.01)
*C01B 3/14* (2006.01)
(Continued)

(52) U.S. Cl.
CPC .............. *C01B 32/324* (2017.08); *C01B 3/14* (2013.01); *C01B 32/39* (2017.08); *C10J 3/005* (2013.01);
(Continued)

(58) Field of Classification Search
CPC ......... C01B 32/324; C01B 3/14; C01B 32/39; C01B 2203/0283; C01B 2203/085;
(Continued)

(56) References Cited

U.S. PATENT DOCUMENTS

| 8,715,582 B1 | 5/2014 | Decker et al. | |
| 2012/0118106 A1* | 5/2012 | Meng | F23G 5/0276 75/414 |
| 2015/0183644 A1* | 7/2015 | Siu | C01B 32/336 423/445 R |

FOREIGN PATENT DOCUMENTS

| CN | 108516552 A | 9/2018 |
| GB | 2513143 A | 10/2014 |

(Continued)

OTHER PUBLICATIONS

International Search Report dated Aug. 3, 2020 for PCT/GB2020/050100.
(Continued)

*Primary Examiner* — Anthony J Zimmer
*Assistant Examiner* — Syed T Iqbal
(74) *Attorney, Agent, or Firm* — Suiter Swantz IP (57) ABSTRACT

The process includes activating a char in an oven by heating the char with steam to generate activated carbon and syngas. The process also includes monitoring parameters of the syngas produced and controlling the oven in response to the parameter. The process converts a feedstock, typically organic waste, into useable products.

18 Claims, 6 Drawing Sheets

(51) Int. Cl.
*C01B 32/39* (2017.01)
*C10J 3/00* (2006.01)
*C10J 3/72* (2006.01)

(52) U.S. Cl.
CPC ....... *C10J 3/723* (2013.01); *C01B 2203/0283* (2013.01); *C01B 2203/085* (2013.01); *C10J 2300/094* (2013.01); *C10J 2300/0976* (2013.01); *C10J 2300/1276* (2013.01)

(58) Field of Classification Search
CPC ......... C01B 32/336; C10J 3/005; C10J 3/723; C10J 2300/094; C10J 2300/0976; C10J 2300/1276
See application file for complete search history.

(56) References Cited

FOREIGN PATENT DOCUMENTS

| | | |
|---|---|---|
| WO | 0246331 A1 | 6/2002 |
| WO | 2006064320 A1 | 6/2006 |
| WO | 2009145724 A2 | 12/2009 |

OTHER PUBLICATIONS

Written Opinion dated XXXXXX for PCT/GB2020/050100.
Saudi Authority for Intellectual Property, SA Office Action received in Application No. 521422553, Dec. 26, 2024, 17 pages (including translation).
United Arab Emirates, Ministry of Economy, AE Office Action received in Application No. P6001254/2021, Oct. 10, 2024, 9 pages.

* cited by examiner

PROCESS FOR PRODUCING ACTIVATED CARBON AND HYDROGEN

CROSS-REFERENCE TO RELATED APPLICATIONS

The present application is a National Stage of International Application No. PCT/GB2020/050100, filed Jan. 17, 2020, which claims priority to United Kingdom Patent Application No. 1900676.6, filed Jan. 17, 2019, all of which are hereby incorporated by reference in their entireties.

FIELD OF INVENTION

The present invention relates to the field of processing of organic materials. Specifically, the invention relates to processes and machinery for generating activated carbon and hydrogen from organic materials.

BACKGROUND

Activated Carbon (AC) is a processed form of carbon which is highly porous and has a high proportion of small, low-volume pores. AC has an extremely high surface area and its adsorption properties make it particularly desirable for, among other purposes, liquid and gas purification and filtration. There are two main production routes for producing AC: acid-base chemical treatments and thermal treatments. AC is often formed from a carbonised organic feedstock such as: waste wood, coconut shell, coal etc. The carbonised feedstock is also known as 'char'.

Important processes for producing hydrogen gas include steam reforming of hydrocarbons, gasification of coal, enzymatic decomposition of sugar, and conversion of glucose and alcohol. At present almost 90% of the worldwide $H_2$ originates from fossil fuels, with natural gas, naphtha and coal being the most common feedstocks.

SUMMARY OF INVENTION

Activated Carbon Production Processes

In chemical treatment methods, carbonisation (which means that pure carbon is extracted from the feedstock) and activation of a carbonaceous source, such as coal, coconut husk, or any other carbonaceous material occur simultaneously. The material is submerged in a bath of acid, base, or other chemicals. The bath is then heated to temperatures of 450-900° C. The carbonaceous material is carbonised and then activated at a much quicker pace than via the thermal treatment method.

In the thermal treatment method, a carbonaceous source is carbonised by a pyrolysis process. The pyrolysis process typically comprises heating the feedstock in an inert environment at temperatures between 500 to 600° C. Once the material is carbonised, it is activated/oxidised, either by exposure to $CO_2$ or by steam treatment, and heated to temperature from 800 to 1,100° C. These conditions cause oxygen to bond to the carbon's surface.

Steam Activation

Steam activation is the most widely used thermal treatment process to activate carbonaceous materials. Steam activated carbons are produced in a two-stage process. Firstly, the raw material is provided in the form of lumps of pre-sized material and carbonised by heating in an inert atmosphere so that dehydration and devolatilisation of the raw material occurs. Carbonisation reduces the volatile content of the source material to under 20%. A char is produced which has pores that are either small or too restricted to be used as an adsorbent. This is then followed by activation with steam at 800-1,100° C. Since the overall reaction is endothermic, heat is required in the two following main steam activation reactions:

$$C\ (s) + H_2O\ (g) \leftrightarrows CO\ (g) + H_2\ (g) + 131.46\ \text{KJ/mol} \qquad (1)$$

$$CO\ (g) + H_2O\ (g) \leftrightarrows CO_2\ (g) + H_2\ (g) - 41\ \text{KJ/mol} \qquad (2)$$

Due to the quality required for the AC as measured by iodine number and surface area, the successful control of the two reactions is important for the process to be successful.

Compared to the chemical treatment method, steam activation requires higher process temperatures (800-1100° C. compared to 500-600° C.) and the processing time is 2 to 3 times longer than by chemical activation. Thus, steam activation results in a lower yield than chemical activation, which only requires 1 hour at a temperature in the range 450 to 800° C. Furthermore, due to the difficulty of controlling the process, steam activation leads to poor control of the porosity, with low activation in the inside core.

Existing processes for making AC do not offer any possibility of identifying the AC quality until the batch is finished and sent to the lab for identification and assessment. This means there is a significant loss of time and that batches which do not meet the quality criteria are ultimately written-off and wasted.

One of the by-products of steam activation processes is synthesis gas (syngas). Synthesis gas is a mixture of CO, $H_2$, and often a small amount of $CO_2$. The present inventors have also identified that hydrogen produced from AC production processes using existing steam activation techniques is typically of a low percentage (by volume) of the gas output and not economically viable to extract. Hydrogen output is low, because:

a) Hydrogen has a low activation energy and a strong affinity to bind with any free oxygen at elevated temperatures. Thus, with any introduction of oxygen or air into the processing chamber (e.g. via direct heating or continuous char feeding), the hydrogen immediately reacts generating water vapor. Thus, the hydrogen is rapidly depleted. In continuous feeding processing chambers (which are the norm in AC production), air also enters the processing chamber in which the activation is taking place in sufficient quantities and on a continuous basis such that it causes an increase in $CO_2$ in the syngas output.

b) Typically, the char toward the end of a continuous feeding processing chamber becomes depleted from volatile compounds, and the organic material is now mostly stable fixed carbon. At this point, a smaller amount of CO is emitted since fewer solid carbon molecules react. With a lower amount of C and CO emitted from the char, a much lower amount of hydrogen is generated through the reaction (3) below:

$$C(s) + CO_2\ (g) \leftrightarrows 2CO\ (g) + 172.5\ \text{KJ/mol} \qquad (3)$$

And a steam gasification reaction (SGR):

$$C\ (s) + H_2O\ (g) \leftrightarrows CO_2\ (g) + H_2(g) + 131.3\ \text{KJ/mol} \qquad (4)$$

As the two reactions proceed, the generated CO also reacts with steam to form $CO_2$ and $H_2$, which is the water gas shift reaction (WGSR):

$$CO(g) + H_2O(g) \leftrightarrows CO_2(g) + H_2(g) - 41.1\ \text{KJ/mol} \qquad (5)$$

However, as noted above, the extra oxygen leaking into the processing chamber will quickly bind with the produced hydrogen, producing water vapour:

$$2H_2\ (g) + O_2\ (g) \leftrightarrows 2H_2O(g) \qquad (6)$$

At the same time some of the CO may also convert to CO$_2$:

$$2CO(g) + O_2(g) \leftrightarrows 2CO_2(g) \tag{7}$$

c) In a continuous feeding process, the gases emitted from the processing chamber (when measured at the output) will have the average of all gases (CO, CO$_2$, and H$_2$) generated along the length of the continuous processing chamber, and they will be mixed together. Although a higher volume of H$_2$ is generated from the fresh and highly reactive char at the beginning of the process, it is mixed with the hydrogen depleted gas generated from the char toward the end of the processing chamber (where the volatile and free carbon is largely depleted). Thus overall the output gases will have a low hydrogen percentage (by volume), which does not lead to economically viable recovery of the hydrogen.

Hydrogen Generation

Steam reforming, partial oxidation and auto-thermal reforming are the primary methods used for the production of H$_2$ from a hydrocarbon source, with steam methane reforming (SMR) being the most established and commonly used process on a large scale. Over 50% of the world's hydrogen production comes from the SMR process. The conventional SMR process used in industries consists of two main steps: in the first step, an endothermic SMR reaction (8) takes place at a high temperature of approx. 800 to 1000° C. and medium pressure of 20 to 35 atm (approx. 2,000 kPa to 3500 kPa); in the second step, an exothermic water gas shift reaction (WGSR) (9) runs at a lower temperature of approx. 200 to 400° C. and medium pressure of 10 to 15 atm (approx. 1000 to 1500 kPa).

$$CH_4(g) + H_2O(g) \leftrightarrows CO(g) + 3H_2(g) + 206 \text{ KJ/mol} \tag{8}$$

$$CO(g) + H_2O(g) \leftrightarrows CO_2(g) + H_2(g) - 41 \text{ KJ/mol} \tag{9}$$

This two-step process of SMR enhances the H$_2$ production by shifting both reactions in the forward direction: the reaction (8) at a high temperature followed by reaction (9) at a lower temperature. The overall SMR process is endothermic in nature and requires additional heat to proceed. The global SMR reaction is given as:

$$CH_4(g) + 2H_2O(g) \leftrightarrows CO_2(g) + 4H_2(g) + 165 \text{ KJ/mol} \tag{10}$$

The conventional steam methane reformer consists of a furnace which contains tubes with a catalyst loaded therein to speed up the rate of the reaction (3).

The present invention attempts to address or ameliorate one or more of the above problems with existing methods of AC and/or H$_2$ production, or provide a useful alternative. The present invention attempts to accelerate the processing and production of Activated Carbon formed by a steam activation process. The present invention attempts, by utilising continuous monitoring of the reactor atmosphere and syngas produced, to infer the status of the AC inside the reactor.

According to an aspect of the present invention, there is provided a process for producing activated carbon. The process may comprise activating a char in an oven. Activating the char may comprise heating the char in the presence of steam to generate activated carbon and syngas. Activating the char may comprise monitoring at least one parameter of the syngas produced. Activating the char may comprise controlling the processing chamber in response to the parameter.

The process may further comprise carbonising an organic feedstock to produce the char. The organic feedstock may be any suitable carbonaceous feedstock. The organic feedstock may be coal, wood, coconut husk or other plant fibres etc.

The carbonisation and/or activation may be carried out in a processing chamber within the oven.

The oven may be heated to 700-1200° C. Preferably the oven may be heated to 800-1100° C. In some embodiments, the oven may be heated to at least 800° C. and/or at most 1100° C.

The steam may be heated prior to injection into the processing chamber. The steam may be heated to 800-1100° C. The steam may be heated to a temperature higher than the char.

The oven and/or the steam may be electrically heated. Electrical heating minimises the opportunity for oxygen to enter the processing chamber.

The process may be carried out at 1 atm or approximately 1 atm of pressure (approx. 1 bar or 100 kPa).

The process may further comprise rotating the oven. The oven may be rotatable up to 145° clockwise and/or up to 145° anti-clockwise. The oven may be rotatable up to 90° clockwise and/or up to 90° anti-clockwise. The oven may be rotated to approximately 90° during a loading or unloading step.

Monitoring the syngas produced may comprise monitoring one or more of: the output rate; the flow rate; the syngas composition; the syngas calorific value; and the CO, H$_2$ and/or CO$_2$ content in the syngas.

Controlling the oven may comprise controlling a control parameter of the oven. The control parameter may be one or more of:
the rotation speed of the oven;
the rotation angle of the oven;
the heat input of the oven;
the steam injection amount; and
the steam injection speed or rate.

The process may further comprise extracting syngas from the oven and/or processing chamber. The syngas may be extracted via a first flow path. The process may further comprise diverting the extracted syngas to a second flow path e.g. in response to a monitored parameter.

The extracted syngas may be diverted to a second flow path when the hydrogen content of the syngas exceeds a predetermined threshold. The diverted syngas may be further purified to obtain hydrogen gas.

The process may be a batch process. The process may first comprise loading an organic material or char into the oven and/or processing chamber.

The process may further comprise ending the process in response to the monitored parameters. The process may be ended if the monitored parameter exceeds or falls below a predetermined threshold. For example, the process may be ended if the H$_2$ or the C and/or CO content in the syngas falls below a predetermined threshold.

The status of the char may be calculated and/or estimated based on the monitored parameters. Calculating the status may comprise estimating one or more of: the activated carbon yield, the % conversion of the char, the activated carbon quality, the iodine number of the activated carbon, and the surface area of the activated carbon. The oven may be controlled in response to the calculated status of the char. The process may be ended if the activated carbon quality is deemed at or above a predetermined threshold.

According to an aspect of the invention, there is provided an apparatus for producing activated carbon. The apparatus may comprise an oven. The oven may comprise a processing chamber for heating organic material therein. The oven may comprise a steam inlet for directing steam into the oven. The oven may comprise a gas outlet for extracting gases from the oven. The apparatus may further comprise at least one sensor for monitoring a parameter of the gases within the apparatus. The apparatus may further comprise a controller configured to control the oven.

The oven may be rotatable. The oven may comprise a plurality of substantially planar sides. The oven may have a square or rectangular cross section.

The at least one sensor may be configured to monitor the gases within the processing chamber and/or gas outlet.

The controller may be configured to receive data from the at least one sensor. The controller may control the oven in response to said data.

The oven may comprise a valve for the loading and unloading of solid materials to or from the processing chamber. The solid materials may comprise an organic feedstock, char, activated carbon, etc.

The oven may comprise a steam conduit extending along the processing chamber. The steam conduit may be configured to receive steam from the steam inlet. The steam conduit may comprise a steam conduit wall between the steam conduit and the processing chamber. The steam conduit wall may partially divide the processing chamber. The steam conduit may form a wall of the processing chamber. The steam conduit may be substantially planar.

The steam conduit wall may comprise a plurality of apertures. The apertures may be configured to permit steam to pass out of the conduit and into the processing chamber. The apertures may be configured to prevent solid material passing into the steam conduit.

The oven may comprise a gas conduit extending along the processing chamber. The gas conduit may be configured to direct gas to the gas outlet. The gas conduit may form a wall or portion of a wall of the processing chamber. The steam conduit may be substantially planar.

The gas conduit may comprise a gas conduit wall between the gas conduit and the processing chamber. The gas conduit wall may comprise a plurality of apertures configured to permit gas to pass out of the processing chamber and into the gas conduit. The apertures may be configured to prevent solid material passing into the gas conduit.

In some embodiments, the steam conduit and the gas conduit may be provided on opposite sides of the processing chamber. The steam conduit and gas conduit may be configured to define a steam and gas flow path through the processing chamber. The flow path may be linear. The flow path may be configured to pass through a or the bed of organic material within the processing chamber. The flow path may be configured to prevent steam or gas from passing through the processing chamber without passing through a or the bed of organic material within the processing chamber.

The oven may comprise a rotary joint. The steam inlet and the gas outlet may be located in the rotary joint.

The apparatus may further comprise a steam generator and/or steam heater connected to the steam inlet. The steam generator and/or steam heater may comprise a boiler. The steam generator and/or steam heater may be electrically powered.

The steam generator and/or steam heater may be further connected to the gas outlet. The steam generator and/or steam heater may be configured to recirculate the gases from the gas outlet through the steam inlet and into the processing chamber.

The apparatus may further comprise at least one heating panel configured to heat the oven and/or processing chamber. The at least one heating panel may be electrically powered.

The apparatus may further comprise a first extraction conduit for extracting gases from the apparatus. The first conduit may comprise a divert valve configured to divert the gases extracted from the apparatus to a second extraction conduit. The apparatus may comprise a storage device for storing gases extracted from the oven. The apparatus may comprise a separation and/or purification device for separating and/or purifying the gases extracted from the oven.

SPECIFIC DESCRIPTION

Embodiments of the invention will now be described with reference to the figures.

Figure 1:
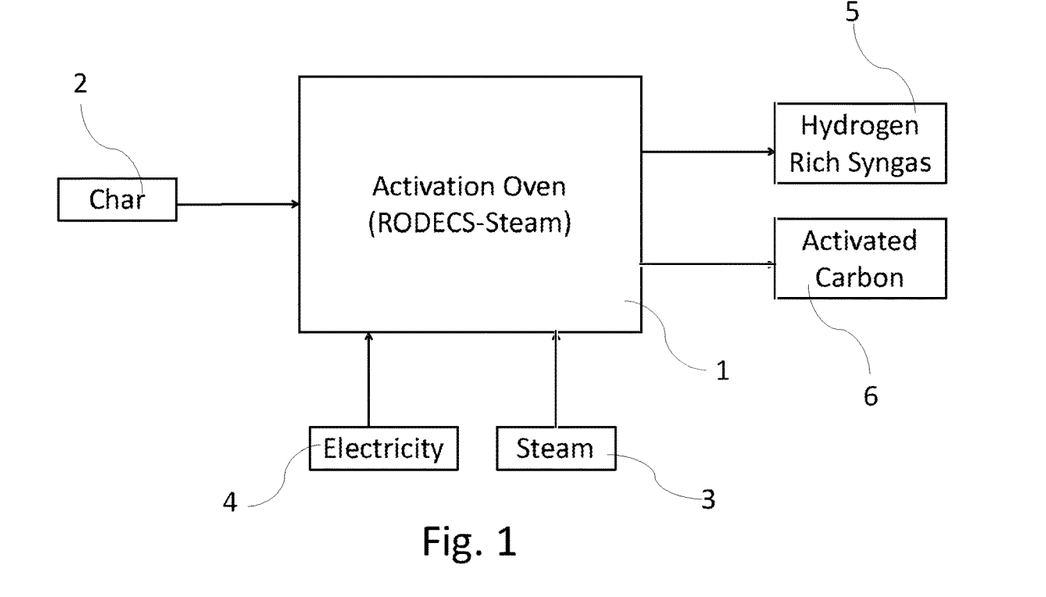
FIG. 1 is a diagram showing an apparatus for producing activated carbon.

FIG. 1 shows a schematic diagram of an apparatus according to the invention. The apparatus has an oven 1 for receiving char 2. The oven 1 is supplied with steam 3 and power 4. As the process progresses, syngas 5 can be extracted, preferably high in $H_2$. At the end of the process, activated carbon 6 can be extracted from the oven 1.

Figure 2:
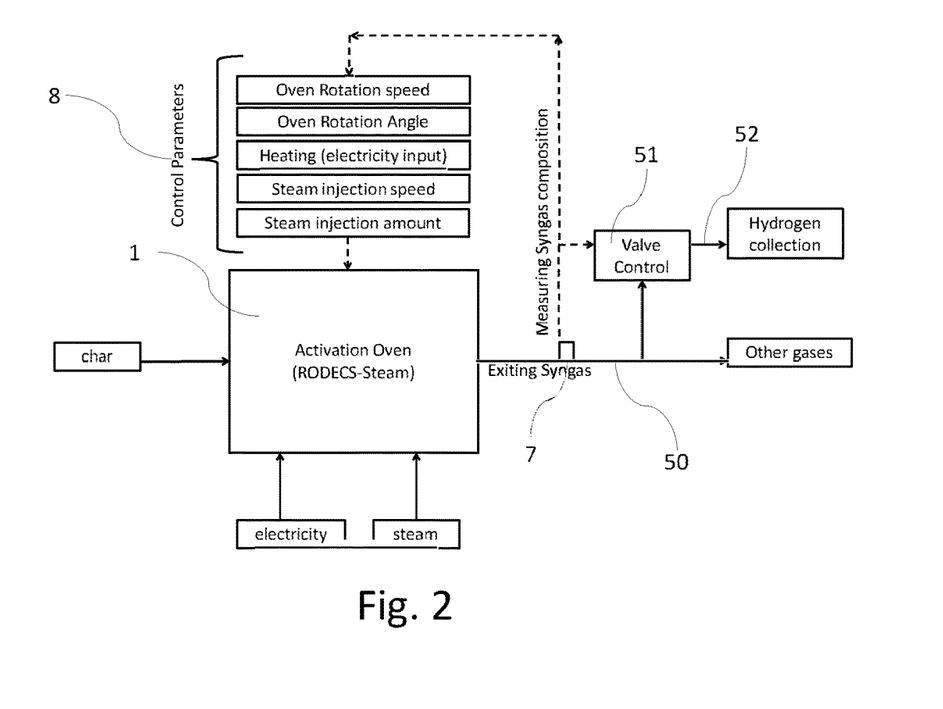
FIG. 2 is a diagram showing an apparatus for producing activated carbon.

FIG. 2 also shows an extraction conduit 50 for extracting syngas from the oven 1. A sensor 7 is provided in the conduit to measure the syngas composition. The sensor 7 is connected to a controller 8 configured to control the oven 1 by adjusting one or more of the control parameters (described below). The extraction conduit 50 has a valve 51 for diverting syngas high in $H_2$ content to a second extraction conduit 52 for collection.

What is proposed in a series of embodiments of the invention is to provide an electrically heated activation oven (RODEOS-Steam) with a homogenous, high temperature and well controlled steam at temperature range of 800° C. to 1100° C., at atmospheric pressure (approx. 1 bar/100 kPa). The steam is injected into a fluidised bed of colder char with the purpose of creating high quality activated carbon. The steam will have only one path where it would have to pass through the layers of stacked char bed (0.2-2.0 meter bed depth high) prior to exiting the activation oven processing chamber. The activation oven can rotate in a rocking movement (−145° to +145°) and through this rocking movement the char bed slides from one end of the oven to the other. It is through this rocking movement and bed slide movement, that the char layers keep shifting their positions and change height inside the activation oven. Thus, through this vertical position shifting every layer will get exposed to the steam, and, from operational experience, after about 7 rocking rotations the char has become fully mixed.

The proposed process is to process the carbon-based feedstock "char" (coal, coconut shell, waste wood, virgin wood, etc.) and while the solid residue is being optimized to produce high quality activated carbon, the gasified carbon molecules (C & CO) are being conserved, manipulated and optimized so as to convert the syngas composition into hydrogen rich syngas according to the reactions below.

$$C(s)+CO_2(g)\leftrightarrows 2CO(g)+172.5 \text{ KJ/mol} \quad (3)$$

And a steam gasification reaction (SGR):

$$C(s)+H_2O(g)\leftrightarrows CO2(g)+H_2(g)+131.3 \text{ KJ/mol} \quad (4)$$

As the two reactions proceed, the generated CO also reacts with steam to form $CO_2$ and $H_2$, which is the water gas shift reaction (WGSR):

$$CO(g)+H_2O(g)\leftrightarrows CO_2(g)+H_2(g)-41.1 \text{ KJ/mol} \quad (5)$$

The hydrogen rich syngas is being generated, spiked, and at the point of spiking, harvested while it is being spiked and while at its highest concentration of $H_2$. This is important since the timely removal of $H_2$ from the activation oven dramatically reduces the undesirable methane production because $H_2$ is a reactant for methanation reactions in the WGS system. Furthermore, at elevated high temperature (>800° C.) the WGSR reactions slow down considerably. After the production of hydrogen-rich syngas, the hydrogen can be purified using well-known and proven hydrogen purification processes.

The activation oven will be using the composition of the syngas exiting or being extracted from the system as an indicator to control the plant rotation angle, speed, and maximum angle of rotation for the purpose of maximizing the char throughput and/or activated carbon yield. Furthermore, the measurements/properties of the syngas exiting/being extracted from the activation oven processing chamber will be used to control and enhance the hydrogen percentages in the exiting syngas and to signal when the harvesting of the hydrogen rich syngas can commence.

Furthermore, the exiting syngas will be used to calculate the amount of carbon losses the char feedstock has suffered. This will be done by storing, over the whole cycle (batch), the accumulated CO, $CO_2$, $CH_4$, and other hydrocarbon ($C_nH_m$) compositions and calculating, based on the gas flow, the amount of carbon depleted from the char (in the activation oven) over the whole cycle. This indication will provide on-line, instantaneous measurement of the weight loss (from the char) and will be used to infer the instantaneous expected quality (iodine number and/or surface area) of the activated carbon being produced.

In addition, the shape of the CO, $CO_2$, and $H_2$ curves over the cycle length/batch process will be correlated with the produced AC quality, and will be used to identify any deviation in the activation oven process from previous recorded processes that yielded acceptable AC quality. Thus these deviations will provide an early warning of potential deviation of either the feedstock batch being processed from other received feedstock, or deviation in the overall process due to other abnormality in the process. Thus it offers the possibility of an immediate recognition of quality deviation in the feed or in the final product.

The following is the detailed process description:

As shown in FIGS. 1 and 2, the activation oven process controller and sensors continually measure the syngas composition throughout the batch for the purpose of:

1. identifying activation process status,
2. controlling AC activation quality,
3. defining when to increase hydrogen formation via higher steam injection, char agitation, and temperature manipulation,
4. defining when to harness the hydrogen (which is dependent on 3 above),
5. accelerating activation process (increasing activation rate), and
6. identifying when the activation process has finished (achieved the AC quality target).

The diagrams in FIGS. 1 and 2 show that the measured syngas signal at the exit of the activation oven can be used to control the operations of the activation oven.

The purpose of the signal measurement and the process controller is to extract the highest possible hydrogen (tonnes of gas per batch), at the highest possible volume concentration percentage, while maximizing the production yield of activated carbon (tonnage per batch), while strictly forecasting and controlling the produced AC quality (for example, as indicated by the Iodine number and/or AC surface area). The accumulated measured syngas composition is used to identify the AC quality of the processed char at the point of measurement.

The maximization of the benefit will be done by:
1—Accelerating the activation of the char, thus increasing the production of the AC per unit time
2—Controlling the yield of the AC, by continuously measuring the amount of carbon from the char that has been gasified, and ensuring no over-processing is done
3—Controlling the quality of the AC, and according to the required quality of the AC product, the pyrolysis can proceed and be controlled according to the total measured carbon molecules in the exiting syngas (leaving the RODECS-Steam)
4—Increasing the amount of Hydrogen being generated via manipulating the RODECS atmospheric condition (amount of steam injected relative to the char being processed, and temperature)
5—Harnessing the hydrogen at the point of the hydrogen being spiked and while it is at its highest concentration, and cutting the harnessing of Hydrogen when concentration drops below the process controller preset economic levels.

Figure 3:
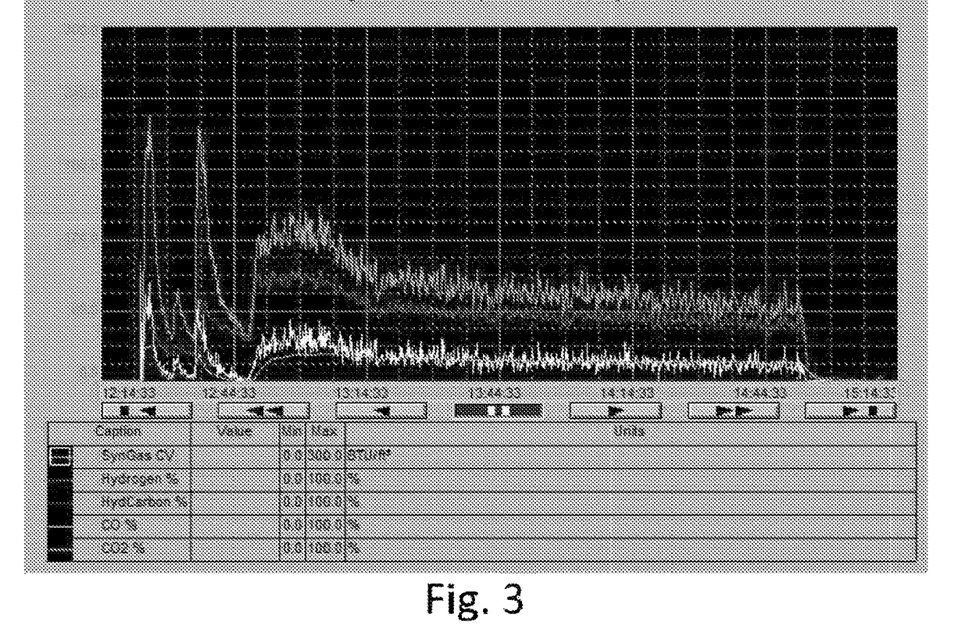
FIG. 3 is a graph showing gas composition generated by the apparatus.

FIG. 3 shows the measured hydrogen concentration at the exit of the Activation Oven. As seen the hydrogen spikes, this spike is induced by the process controller, by adjusting one or a combination of the control parameters below:
1. Oven rotation speed
2. Oven rotation angle
3. Maximum rotation angle
4. Heating (electricity input)
5. Steam injection speed
6. Steam injection amount Hydrogen Generation in Activation Oven (RODECS-Steam)

Figure 7:
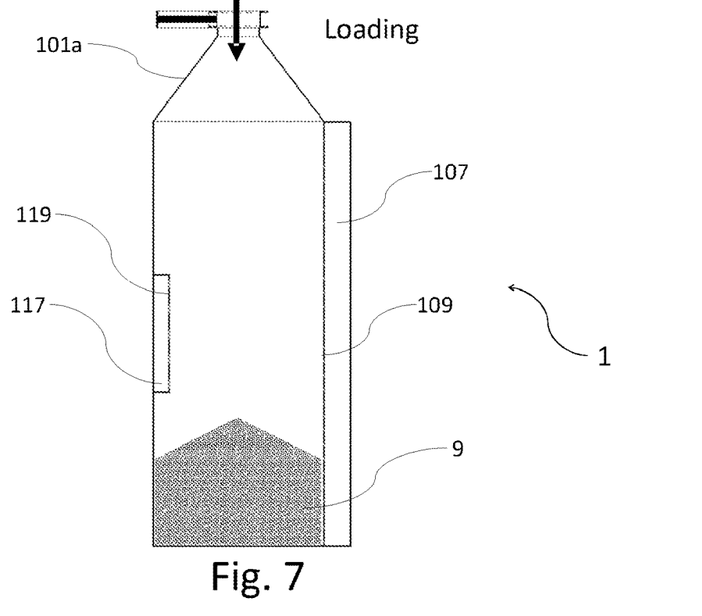
FIGS. 7 and 8 are cross sections through an oven during loading and unloading.

The char (carbonized coal, coconut husk, other organic material etc.) is fed into the activation oven as shown in FIG. 7 (loading). Then the char is heated to a temperature from 800 to 1100° C. using uniformly pre-heated steam. The steam injection is done with a ratio of steam to carbon of 2:5, with a processing time of 2 to 3 hours.

During the activation process, while the steam is being injected, the oven can rotate as shown in FIGS. 9a to 10d from −45 degree to +45 degree. While the char is being activated, syngas is produced as a result of the reactions below. The following gases are emitted: $H_2$, CO, $CO_2$, and $CH_4$.

In order to increase the hydrogen percentage in the activation process in the reactions below:

$$C(s)+CO_2(g) \leftrightarrows 2CO(g)+172.5 \text{ KJ/mol} \quad (3)$$

$$C(s)+H_2O(g) \leftrightarrows CO2(g)+H_2(g)+131.3 \text{ KJ/mol} \quad (4)$$

$$CO(g)+H_2O(g) \leftrightarrows CO_2(g)+H_2(g)-41.1 \text{ KJ/mol} \quad (5)$$

a minimum temperature of 900° C. is required in order to bias reactions (1) and (2) in the forward direction, which produces more $H_2$. However, at elevated temperatures the Water Gas Shift Reaction slows down considerably. Furthermore, at these elevated temperatures should high percentages of $H_2$ persist and not be removed in a timely manner, undesirable methane production would also occur reducing the $H_2$ in favour of methane.

Thus, to ensure that $H_2$ conversion and generation continues, it is important that timely and/or rapid removal of $H_2$ from the activation oven takes place so as to reduce the hydrogen content/partial pressure within the oven. Thus undesirable methane production can be reduced or prevented.

As shown in FIG. 3, an increase in the C, CO, and $H_2$ emissions happen when the char bed inside the activation oven is agitated, for example by rotating the oven to cause the solid material to slide from one side of the oven to the other, and by a combination of mechanical erosion of the char (friction against itself). As a result of the movement, more of the char is exposed to the high temperature, high speed steam. Thus the C particulate, CO, and $CH_4$ gases are emitted, and with the existence of ample high temperature steam, $H_2$ is formed immediately according to previous reactions.

Since the movement of the char is gravity based, as the angle of the oven tilts more sharply, at some point the char bed would start to slide. This is known as overcoming the stiction forces of the bed. The loose solid materials move from one end of the oven to another. However, due to combinations of the irregularity of the char shape, the surface smoothness and the reactiveness of the char surface at these elevated temperatures, the slide of the char is not uniform or predictable. The char may move at a shallow angle during the start of the process, and later in the process require an even sharper angle for it to move. Furthermore, the slide does not always happen gradually, but more like an avalanche of movement when a critical angle reached. Thus, it is difficult to predict. However, this rapid movement is very advantageous since it creates considerable agitation and mechanical erosion which leads to the emission of solid C particulate and CO which lead to the $H_2$ formation.

Since the emission of the syngas is directly related to the formation of pores in the char, and the AC production, it is advantageous to accelerate these spikes in C, CO and $H_2$. This is done by rotating the oven and controlling the speed and angle of rotation. Thus when a spike happens (which signifies that the material has moved from one side to another) then the process controller can cease moving in that rotational direction (e.g. clockwise/anticlockwise) and reverse the rotation direction so as to create another spike in C, CO, and $H_2$ from the slide of the char to the other end of the activation oven.

The process controller can optimize the spiking of the C, CO, and $H_2$ by minimizing the time between the spikes, and by increasing the height of the spike, more specifically increasing the area under the curve of the $H_2$ and CO (which signifies the amount of weight loss and/or pore creation in the char). Thus the process controller may change direction, or simply stop rotation in one direction in favour of reversing the rotation, and it may also accelerate the rotation between angles so as to reach the critical angle where the char bed will start to slide.

Figure 4:
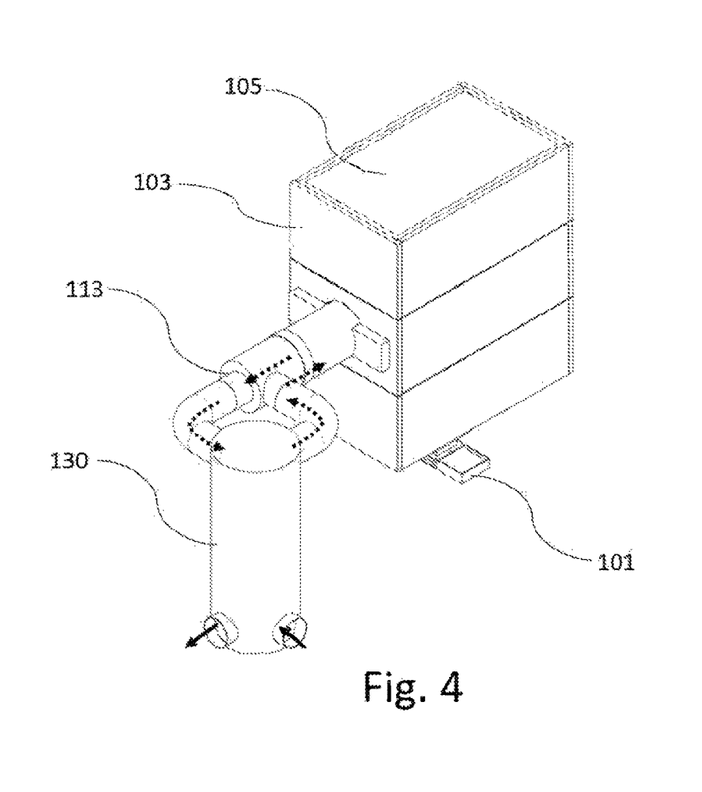
FIG. 4 is a perspective view of an apparatus for producing activated carbon.
Figure 5:
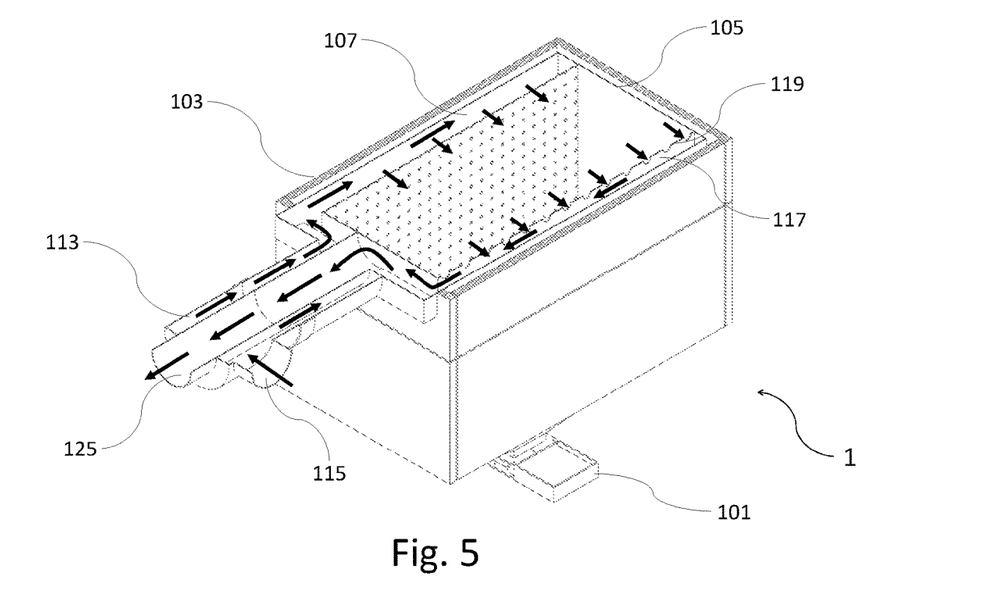
FIG. 5 is a cross section view through the apparatus of FIG. 4.
Figure 6:
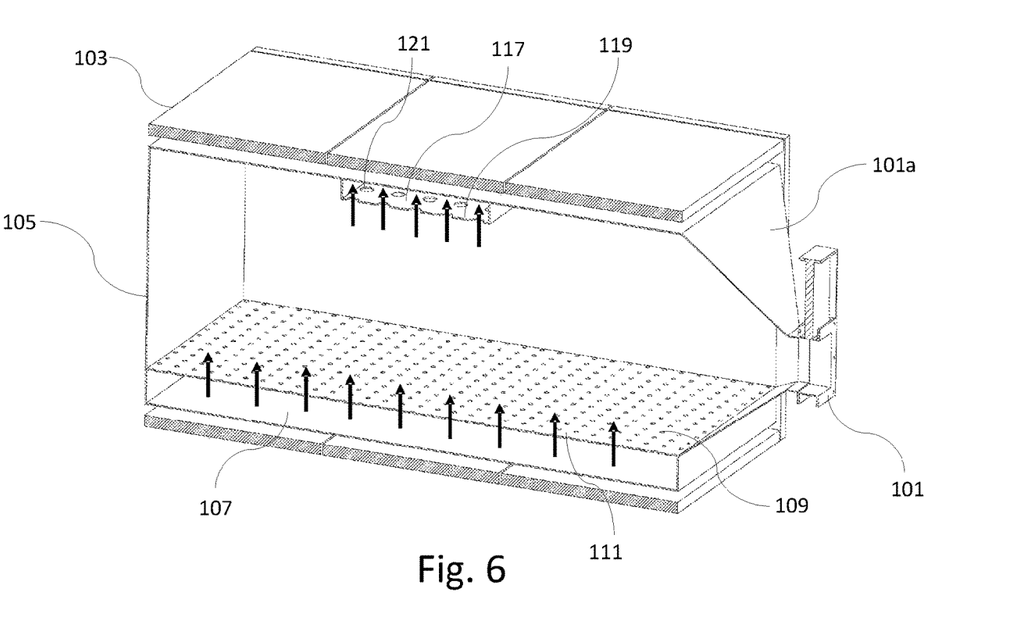
FIG. 6 is a cross section through an oven.
Figure 8:
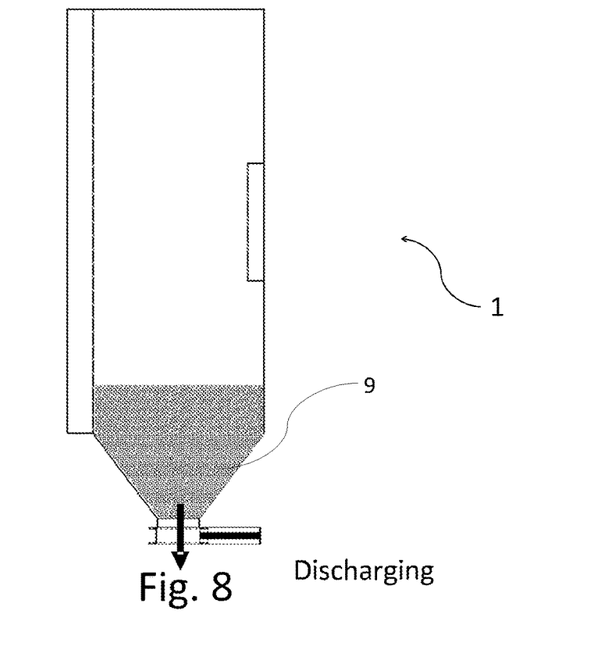

Turning now to FIGS. 4 to 6, there is shown an oven 1. The oven 1 has a substantially cuboidal shape, and comprises a series of planar walls. At an end of the oven there is a valve 101 for the loading and unloading of the oven as shown in FIGS. 7 and 8.

The oven 1 is provided with multiple heating panels 103 around the exterior thereof to heat the processing chamber 105 within. The oven has a steam conduit 107 located between the exterior of the oven and the processing chamber 105. The steam conduit 107 is defined by a steam conduit wall 109 which comprises many apertures 111. The apertures 111 are configured to permit steam to pass from the steam conduit 107 into the processing chamber 105, but prevent char within the processing chamber 105 from travelling in the opposite direction. The steam conduit wall 109 extends across the full width and length of one of the walls of the processing chamber 105. The steam conduit 107 is connected to a steam inlet 115 provided in a rotary joint 113.

The oven 1 has a gas conduit 117 located between the exterior of the oven and the processing chamber 105. The gas conduit 117 is defined by a gas conduit wall 119 which comprises many apertures 121. The apertures 121 are configured to permit gases to pass from the processing chamber 105 into the gas conduit 117. Preferably the apertures 121 do not permit solid materials within the processing chamber to pass into the gas conduit, however in use, the solid materials would not normally come into direct contact with the gas conduit wall 119. The gas conduit wall 119 extends across the full width of one of the walls of the processing chamber 105. The gas conduit 117 is connected to a gas outlet 125 provided in the rotary joint 113.

The apparatus has a steam heater 130 connected to the steam inlet 115 and gas outlet 125. The steam heater is configured to recirculate the gases exiting the processing chamber back through until extraction of the gases is desired.

Not shown in FIGS. 4 to 6 is the controller and sensor(s) configured to continuously monitor the gases being recirculated and/or generated within the oven. As shown in FIGS. 1 and 2, the controller can determine how to control the system and when to extract gases from the system depending on the measured parameters in order to maximise both activated carbon yield and $H_2$ yield.

FIGS. 7 and 8 show that the oven can be inverted in either direction to aid in the loading and unloading of the solid materials 9 within the oven. The solid materials will be either char or activated carbon, depending on the progression of the process. The oven has a tapered region 101a leading to the valve 101 to aid the loading and unloading of the processing chamber 105.

Turning now to FIGS. 9a-10d, the agitation of the char within the oven will be described.

Figure 9A:
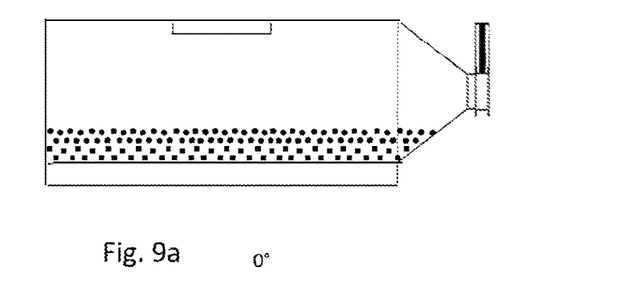
FIGS. 9*a* to 9*d* are cross sections through an oven showing solid particulate movement within the oven.

FIG. 9a—Despite the angle, and depending when in the cycle, the material tends to not shift or slide at shallow angles (depend on the feedstock, granular size, and temperature of the char).

Figure 9B:
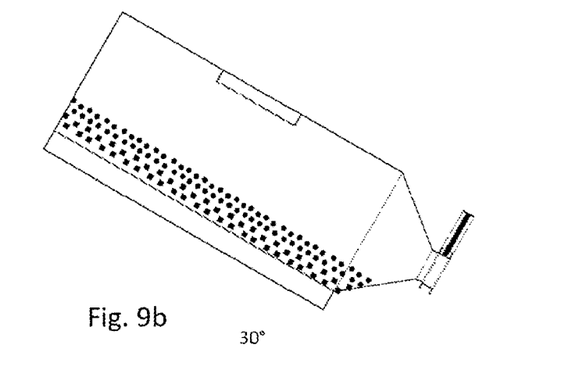

FIG. 9b—At a certain angle (which depends on the feedstock type, granular size, and temperature of the char), the char suddenly slides (like an avalanche) and piles on one side of the chamber.

Figure 9C:
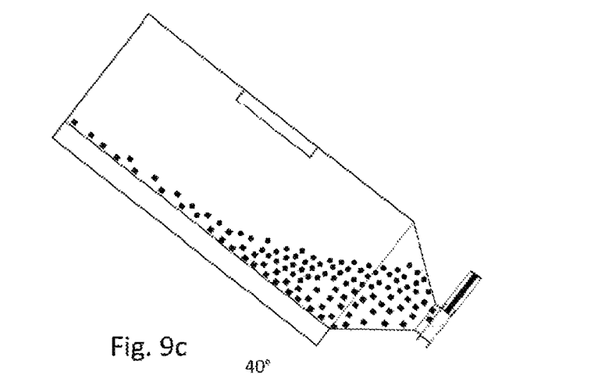

FIG. 9c—With a sharper angle, the granular char continues to pile on one side of the chamber moving further.

Figure 9D:
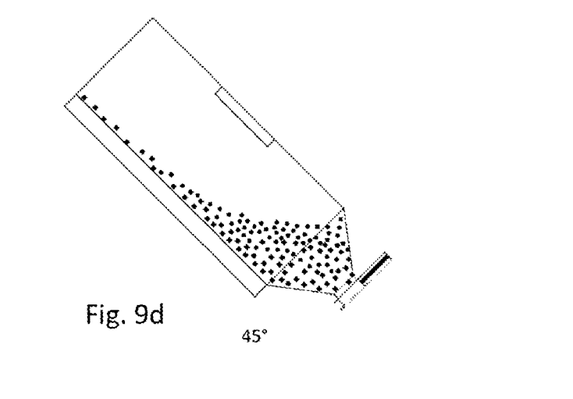

FIG. 9d—Such a movement of material back and forth forces full mixing of the char across all layers, providing even access to the steam (activation).

Figure 10A:
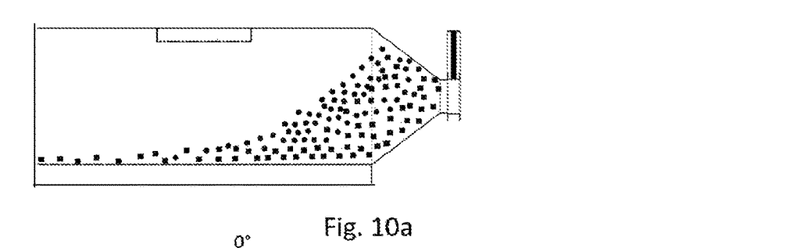
FIGS. 10*a* to 10*d* are cross sections through an oven showing solid particulate movement within the oven.

FIG. 10a—Despite the angle, and depending when in the cycle, the material tends to not shift or slide at shallow angles (depend on the feedstock, granular size, and temperature of the char).

Figure 10B:
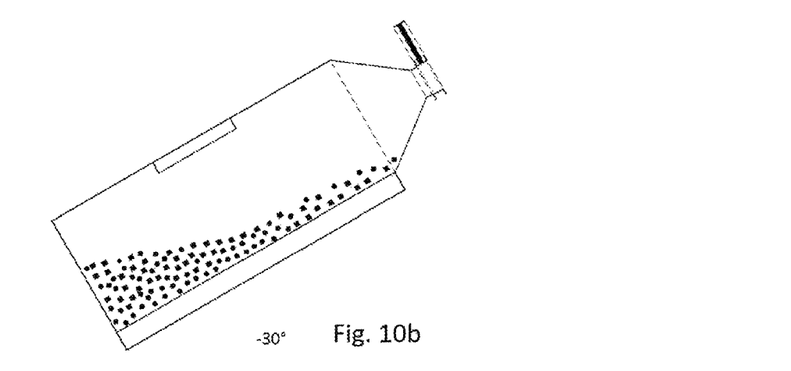

FIG. 10b—At a certain angle (which depends on the feedstock type, granular size, and temperature of the char), the char suddenly slides (like an avalanche) and piles on one side of the chamber.

Figure 10C:
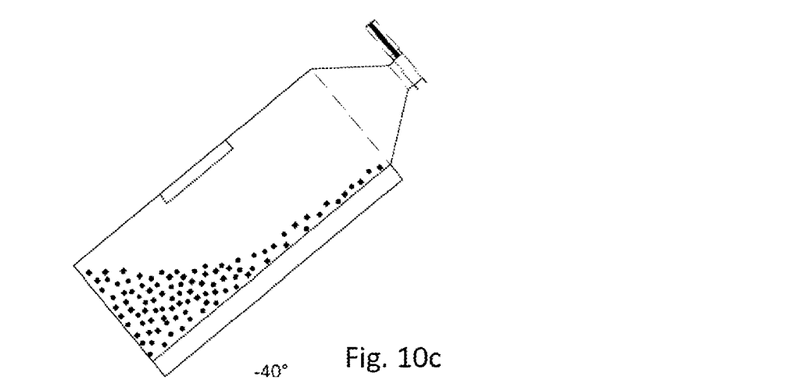

FIG. 10c—With a sharper angle, the granular char continues to pile on one side of the chamber moving further.

Figure 10D:
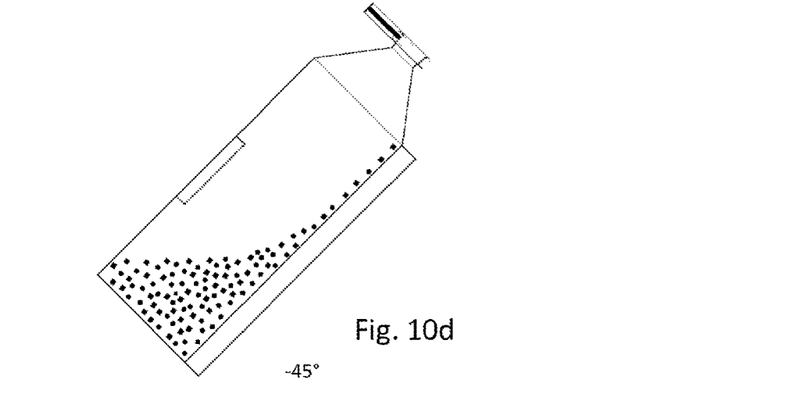

FIG. 10d—Such a movement of material back and forth forces full mixing of the char across all layers, providing even access to the steam (activation).

1—Unlike otherAC manufacturing, in this invention the steam is heated first and then the heated steam is injected into the char. The industry standard has been to heat the atmosphere within the oven/processing chamber or the oven wall(s), and allow for colder steam to be subsequently heated inside the oven/processing chamber. Thus the present invention is a more homogeneous and strictly controlled heating process for the char. This is important since the steam will not cool the AC, and also it achieves a much better control over the AC temperature, where no overheating of the char occurs as a result of higher temperature oven walls (as the case with conventional kilns) or char facing a high temperature flame inside the activation oven reactor (as the case with multi-hearth furnaces). Furthermore, by not using a high temperature flame within the oven, the potential for unintended oxygen ingress into the chamber is minimised.

2—By using moving char fluidized bed methodology, the steam has only one path to exit the activation oven and processing chamber, which is through the multiple layers of moving char bed. Thus no bypass of the char bed by the steam will happen. More specifically, unlike kilns and multi-hearth furnaces there is no way for the steam to simply go straight to the activation oven exit without first passing through and interacting with the multiple bed layers of char. This is important, since the interaction ensures that maximum CO & $H_2$ will be generated inside the oven, and there is no dilution of the generated syngas (when measured at the activation oven exit) with steam that did not interact with char (bypassed char) and headed to the oven exit.

3—Conventional Activated Carbon manufacturing typically exhausts the generated syngas outside the oven/processing chamber and combusts it, either using it for reheating the feedstock or to exhaust it to the atmosphere. In this invention, the process combines two independent and uncorrelated products from the same feedstock. The first is the solid residue of the activation: activated carbon. The second product is in the syngas produced. The apparatus is designed carefully so as to extract hydrogen rich syngas for further treatment and purification with the intent to sell pure hydrogen at the same time as the activated carbon, and from the same batch of feedstock loaded into the activation oven; which could be coal, coconut shell, or wood, or waste wood, etc.

4—The activation oven can use the syngas generation data measured at the exit of the activation oven to accelerate the processing of the char. This will be done by continuously measuring and calculating the gas calorific value (CV), which is a measure of the activation process. Once the activation process slows down (calculated CV drop) then the apparatus either changes the angle of rotation of the oven, or accelerates the rotation or reverses the rotation and accordingly forces the movement and agitation of the char. The increased agitation of the various layers of char bed generates syngas (comprising CO and $H_2$) and generates an activation peak (i.e. a peak in gas production). Thus, the rotation speed, rotation angle, and the maximum rotation angle of the oven are all controlled and dictated by the continuously measured syngas received from the activation oven.

5—Similarly, the hydrogen generation inside the activation oven is also maximised through the rotation of the activation oven and the injection of the steam. While the sensors are continuously measuring the syngas composition, as the activation peaks occur, the steam injection is maximised forcing the conversion of the C and the generated CO to $H_2$. This will instantaneously increase the hydrogen percentages in the activation oven (known as $H_2$ spiking).

6—At the point of $H_2$ spiking (creating of high $H_2$ percentages), a valve is opened forcing the immediate extraction of hydrogen-rich syngas, which is diverted to a separate flow path. The hydrogen-rich syngas can be immediately collected for further processing and for further purification. This is important since the timely removal of $H_2$ from the activation oven dramatically reduces the undesirable methane production because $H_2$ is a reactant for methanation reactions in the WGS system. Thus, in this invention, the hydrogen peak is induced by the combined action of forcing char agitation (slide of the char bed) and the intense injection of steam into the hot syngas atmosphere which is filled with C powder, and CO, to form the $H_2$, then an immediate extraction of the $H_2$-rich syngas via diverting the gases to separate flow path—thus reducing the concentration of $H_2$ in the oven atmosphere. Once the $H_2$ content in the oven is reduced, then either another $H_2$ spiking is performed or the gases can be sent to a separate path where the syngas with lower $H_2$ content is collected.

7—The quality of the activated carbon being produced inside the activation oven is being inferred through the carbon loss measurement of the char for each batch. The carbon loss measurement is done by continuous measurement and through accumulated measurements of the combined CO and $CO_2$ in the syngas exiting the activated oven during the full batch cycle. This molecular calculation of the amount of carbon carried by the syngas and exiting the activation oven would provide an indication for when to stop the activation process, and halt the batch.

8—Furthermore, the quality of the produced activated carbon for each feedstock is a direct consequence of the operating atmosphere of the activated oven. Thus by fingerprinting the CO and $CO_2$ curve achieved for each type of feedstock that produces successful and acceptable AC quality, it is possible to infer the expected quality of the future batches. Thus the combined parameters of the activated carbon (temperature, steam injection, and flow gases, and rotation speed, and angle) are all used and adjusted by the control process to reproduce the shape of the CO and $CO_2$ curves.

9—The shape of the CO, $CO_2$ and $H_2$ curves would also provide an indication of the type of feedstock being processed, thus it should provide an early indication of changes being made to the feedstock, or deviation of the feedstock from the declared specification received. Thus this permits verification of the quality of the received feedstock, and also provides historical data that confirm the received material specification.

The invention claimed is:

1. A process for producing activated carbon, the process comprising:
  activating a char in an oven, wherein the activating the char comprises:
    heating the char in the presence of steam to generate activated carbon and syngas;
    monitoring at least one parameter of the syngas produced, wherein the monitoring the at least one parameter of the syngas produced comprises monitoring at least one of carbon monoxide, hydrogen gas, or carbon dioxide;
    rotating the oven; and
    controlling the oven in response to the monitored at least one parameter of the syngas produced, wherein the controlling the oven comprises controlling one or more control parameters of the oven, wherein the one or more control parameters include at least one of a rotation speed of the oven or a rotation angle of the oven.

2. The process according to claim 1, further comprising carbonising an organic feedstock to produce the char.

3. The process according to claim 1, wherein the oven is heated to 800-1100° C.

4. The process according to claim 1, wherein the steam is heated prior to injection into a processing chamber, within the oven, in which the activation of the char is carried out.

5. The process according to claim 4, wherein the steam is heated to 800-1100° C.

6. The process according to claim 1, wherein the process is carried out at 1 atm of pressure.

7. The process according to claim 1, wherein the oven is rotated up to 145° clockwise and/or up to 145° anti-clockwise.

8. The process of claim 1, wherein the monitoring the at least one parameter of the syngas produced comprises monitoring one or more of: an output rate, a flow rate, a composition of the syngas, or a calorific value of the syngas.

9. The process according to claim 1, wherein the one or more control parameters further include one or more of:
  a heat input of the oven;
  a steam injection amount; or
  a steam injection speed or rate.

10. The process of claim 1, further comprising extracting the syngas from the oven and/or a processing chamber, within the oven, in which the activation of the char is carried out.

11. The process according to claim 10, wherein the syngas is extracted via a first flow path and the process further comprises diverting the extracted syngas to a second flow path, in response to the monitored at least one parameter of the syngas produced.

12. The process according to claim 11, wherein the extracted syngas is diverted to the second flow path when hydrogen content of the syngas exceeds a predetermined threshold.

13. The process according to claim 12, wherein the diverted syngas is further purified to obtain the hydrogen gas.

14. The process according to claim 1, wherein the process is a batch process.

15. The process according to claim 1, wherein the process first comprises loading an organic material or char into the oven and/or a processing chamber, within the oven, in which the activation of the char is carried out.

16. The process according to claim 1, wherein the oven is controlled in response to a status of the char calculated based on the monitored at least one parameter of the syngas produced.

17. The process according to claim 16, wherein the calculating the status of the char comprises estimating one or more of: an activated carbon yield, a percentage conversion of the char, an activated carbon quality, an iodine number of the activated carbon, or a surface area of the activated carbon.

18. The process according to claim 17, wherein the process is ended if the activated carbon quality is deemed at or above a predetermined threshold.

* * * * *